United States Patent
Yoshimoto et al.

(10) Patent No.: US 7,441,807 B2
(45) Date of Patent: Oct. 28, 2008

(54) TELESCOPIC STRUCTURE AND STEERING COLUMN DEVICE FOR MOTOR VEHICLE

(75) Inventors: Shin Yoshimoto, Gunma (JP); Kiyoharu Higashino, Gunma (JP); Kiyoshi Sadakata, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 471 days.

(21) Appl. No.: 10/544,788

(22) PCT Filed: May 25, 2004

(86) PCT No.: PCT/JP2004/007453

§ 371 (c)(1),
(2), (4) Date: Aug. 8, 2005

(87) PCT Pub. No.: WO2004/106141

PCT Pub. Date: Dec. 9, 2004

(65) Prior Publication Data

US 2006/0097501 A1    May 11, 2006

(30) Foreign Application Priority Data

May 27, 2003    (JP) ............................. 2003-149682

(51) Int. Cl.
*B62D 1/00* (2006.01)
(52) U.S. Cl. ......................................... 280/777; 74/493
(58) Field of Classification Search ................ 280/775, 280/777; 74/492, 493
See application file for complete search history.

(56) References Cited

U.S. PATENT DOCUMENTS 3,703,105 A    11/1972  Milton et al.
5,640,884 A *  6/1997  Fujiu et al. ................. 74/492
5,829,310 A * 11/1998  DePaolis ..................... 74/492
6,099,036 A *  8/2000  Fujiu et al. ................ 280/777

(Continued)

FOREIGN PATENT DOCUMENTS

DE    10224570 A1    12/2002

(Continued)

*Primary Examiner*—Kevin Hurley
*Assistant Examiner*—Robert A. Coker
(74) *Attorney, Agent, or Firm*—Sughrue Mion, PLLC

(57) ABSTRACT

An automotive steering column apparatus has an inner column rotatably supporting a steering shaft, an outer column holding the inner column while rotatably embracing the inner column, a vehicle body side bracket having a vehicle body mount portion which can be mounted on a vehicle body and a pair of left and right facing flat plate portions which extend substantially vertically and disposed in such a manner as to surround the outer column, a clamping mechanism for changing a width of the pair of facing flat plate portions and changing a width of an inner circumferential surface of the outer column in connection with a change in the width of the pair of facing flat portions, and a shear ring mounted on at least either the inner circumferential surface of the outer column or an outer circumferential surface of the inner column. A shear permissive projection is provided on the shear ring. A groove is formed in at least either the inner circumferential surface of the outer column or the outer circumferential surface of the inner column. The shear permissive projection is in engagement with the groove.

4 Claims, 13 Drawing Sheets

U.S. PATENT DOCUMENTS 6,364,357 B1 *  4/2002  Jurik et al. .................. 280/775
6,659,504 B2 * 12/2003  Riefe et al. .................. 280/777

FOREIGN PATENT DOCUMENTS

| | | |
|---|---|---|
| EP | 713820 A1 | 5/1996 |
| JP | 1-128460 U | 9/1989 |
| JP | 7-8157 U | 2/1995 |
| JP | 2584258 Y2 | 8/1998 |
| JP | 11-291922 A | 10/1999 |
| JP | 2002-211413 A | 7/2002 |

* cited by examiner

TELESCOPIC STRUCTURE AND STEERING COLUMN DEVICE FOR MOTOR VEHICLE

TECHNICAL FIELD

The present invention relates to a telescopic construction which improves the impact energy absorbing performance of a vehicle at the time of a secondary collision and an automotive steering column apparatus.

BACKGROUND ART

When an automobile collides with another automobile or a building, there may be a risk that the driver is brought into a secondary collision with the steering wheel due to inertia. In recent passenger vehicles, in order to prevent the driver from getting injured in case such an accident occurs, impact absorbing steering column apparatuses are widely used together with seat belts and air bags. While there exist various types of impact absorbing mechanisms which are adopted for the impact absorbing steering column apparatuses, a double-tube type steering column apparatus is generally used in which a steering column collapses (decreases in length) together with a steering shaft when the driver has a secondary collision so as to absorb impact energy during the collapse.

The impact absorbing steering column apparatus of this type includes, for example, an outer column supported on a vehicle body side bracket, an inner column slidably fitted in the outer column and an impact energy absorbing means interposed between the outer column and the inner column, and when an axial load of a predetermined value or greater is applied to the steering column apparatus, the inner column slides into the outer column, whereby the impact energy is absorbed by the impact energy absorbing means as the inner column slides into the outer column.

In contrast, in an automotive steering system, it is desirable that the position of the steering wheel can be adjusted in accordance with builds and driving postures of individual drivers as the steering wheel is used (operated) by an unlimited number of drivers. With a view to satisfying such a demand, a tilt mechanism and a telescopic mechanism are used on an increasing number of trucks as well as passenger vehicles.

The tilt mechanism is a mechanism for adjusting vertically the position of a steering wheel and is made up of a tilt pivot for supporting a steering column in such a manner as to allow for a tilt and a tilt holing means for holding the steering column at a desired position (tilt angle). In addition, the telescopic mechanism is a mechanism for adjusting the position of the steering wheel in a longitudinal direction (an axial direction of a steering shaft) and is made up of a telescopic portion of double-tube type for use for allowing for a telescopic movement of the steering shaft and a telescopic holding means for holding the steering shaft at a desired position (telescoped amount).

In Japanese Patent Unexamined Publication JP-A-11-291922 and Japanese Utility Model Registration No. 2584258, in a steering column apparatus including a tile mechanism and a telescopic mechanism, impact energy is designed to be absorbed by an impact energy absorbing means.

DISCLOSURE OF THE INVENTION

The invention is intended to provide a telescopic construction and an automotive steering column apparatus which can regulate a telescopic stroke within a predetermined range and suppress the generation of a peak load during a collapse occurring at the time of a secondary collision to a minimum level.

Figure 1:
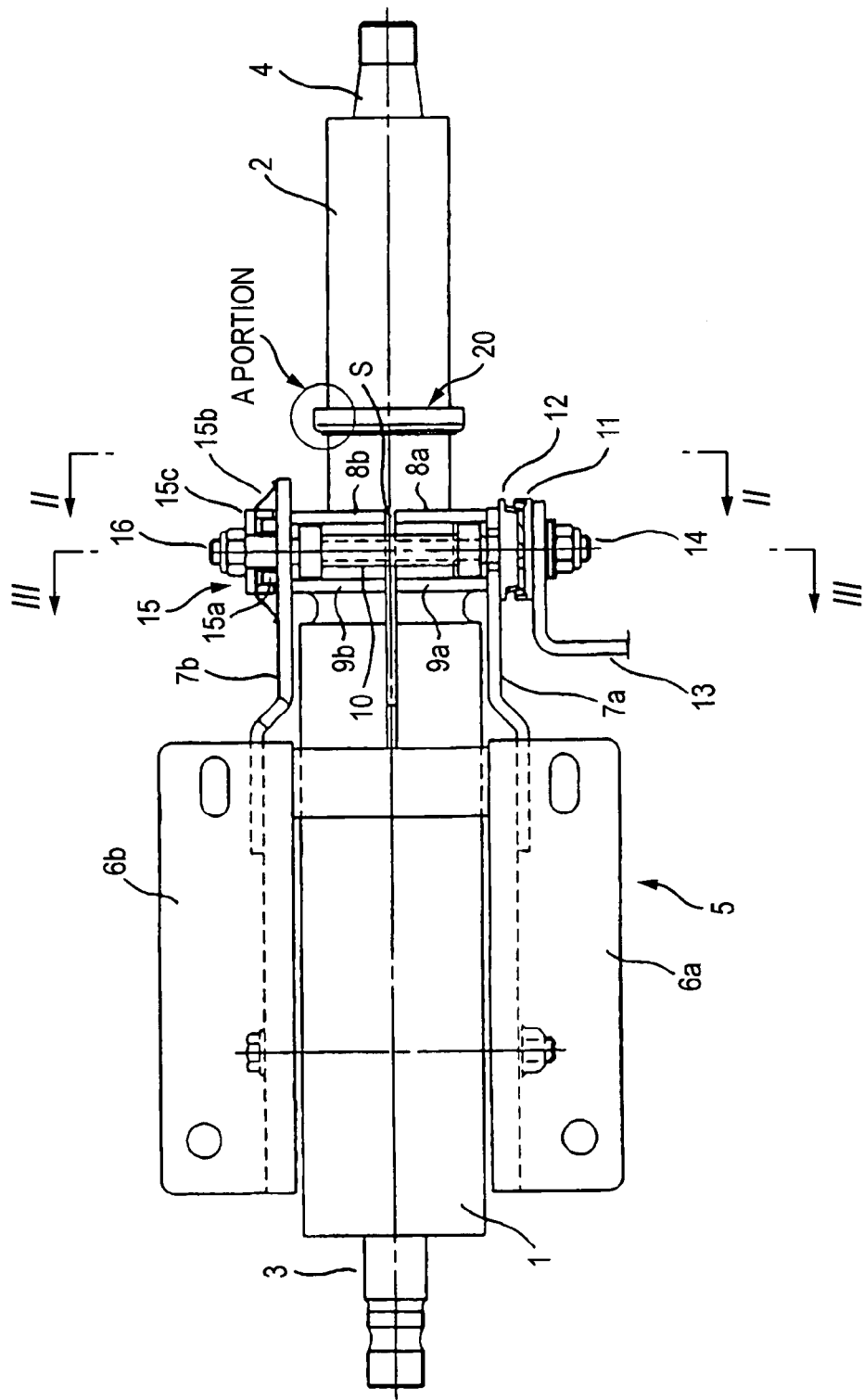
FIG. 1 is a plan view of an automotive tilt and, telescopic steering column apparatus according to a first embodiment of the invention.

In the drawings, reference numerals and characters as follows: 1 denoting a lower side outer column; 2 denoting an upper side inner column; 3 denoting a lower shaft; 4 denoting an upper shaft; 5 denoting a vehicle body side bracket; 6a and 6b denoting vehicle body mounting portions; 7a and 7b denoting facing flat plate portions; 8a, 8b, 9a and 9b denoting clamping portion; HBa and HBb denoting half body portions 8; 10 denoting a tension member; 11 denoting a first cam member; 12 denoting a second cam member; 13 denoting an operation lever; 14 denoting an adjusting bolt; 15 denoting an interlocking rack mechanism; 15a denoting a stationary side rack; 15b denoting a lifter spring; 15c denoting a moving side rack; 16 denoting an adjusting bolt; 17a and 17b denoting a tilting elongated hole; 18 denoting a pin; 19 denoting a telescopic adjustment groove; 20 denoting a shear ring; 21 denoting a resin ring; 21a denoting a shear permissive projection; 22b denoting a minute projection; 22 denoting a metallic ring; 23 denoting a damping member; 30 denoting an electric power steering system; 31 denoting an electric motor; S denoting a slit; 40 denoting an intermediate shaft; 41 denoting an outer tube; 42 denoting an inner shaft; 43 and 44 denoting a universal joint; 50 denoting a tightening bolt; 51 denoting a tilt center pin; 52a and 52b denoting a clamping portion; 53 denoting a thrust bearing; 54 denoting an adjusting nut; 61 denoting a lower side inner column; 62 denoting an upper side outer column; 63 denoting a lower side inner shaft; 64 denoting an upper side outer tube; 65 denoting a lower side vehicle body bracket; 66 denoting a tilt center pin; 67 denoting an upper side vehicle body bracket; 68a and 68b denoting a vehicle body mounting portion; 69a and 69b denoting a facing flat plate portion; 70a and 70b denoting a tilting elongated hole; 71 denoting a distance bracket; 72a and 72b denoting telescoping elongated hole; 73 denoting a tightening bolt; 74 denoting an adjusting nut; 75 denoting an operation lever; and 76 denoting a mount bolt.

BEST MODE FOR CARRYING OUT THE INVENTION

Automotive steering column apparatuses according to embodiments of the invention will be described below by reference to the drawings.

FIRST EMBODIMENT

Tilt and Telescopic Type

FIG. 1 is a plan view of an automotive tilt and telescopic type steering column apparatus according to a first embodiment of the invention.

Figure 2:
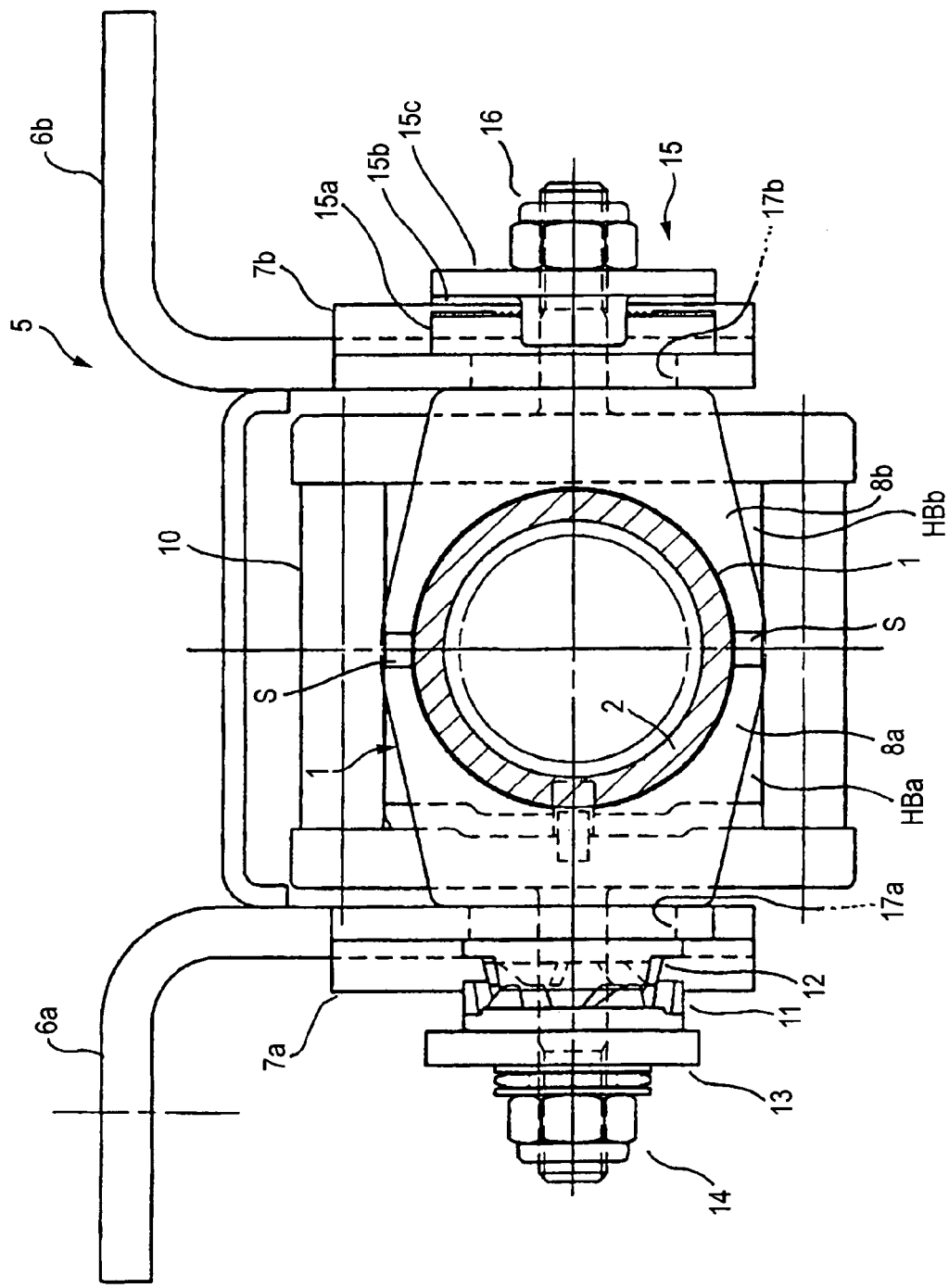
FIG. 2 is a cross-sectional view taken along the line II-II in FIG. 1.
Figure 3:
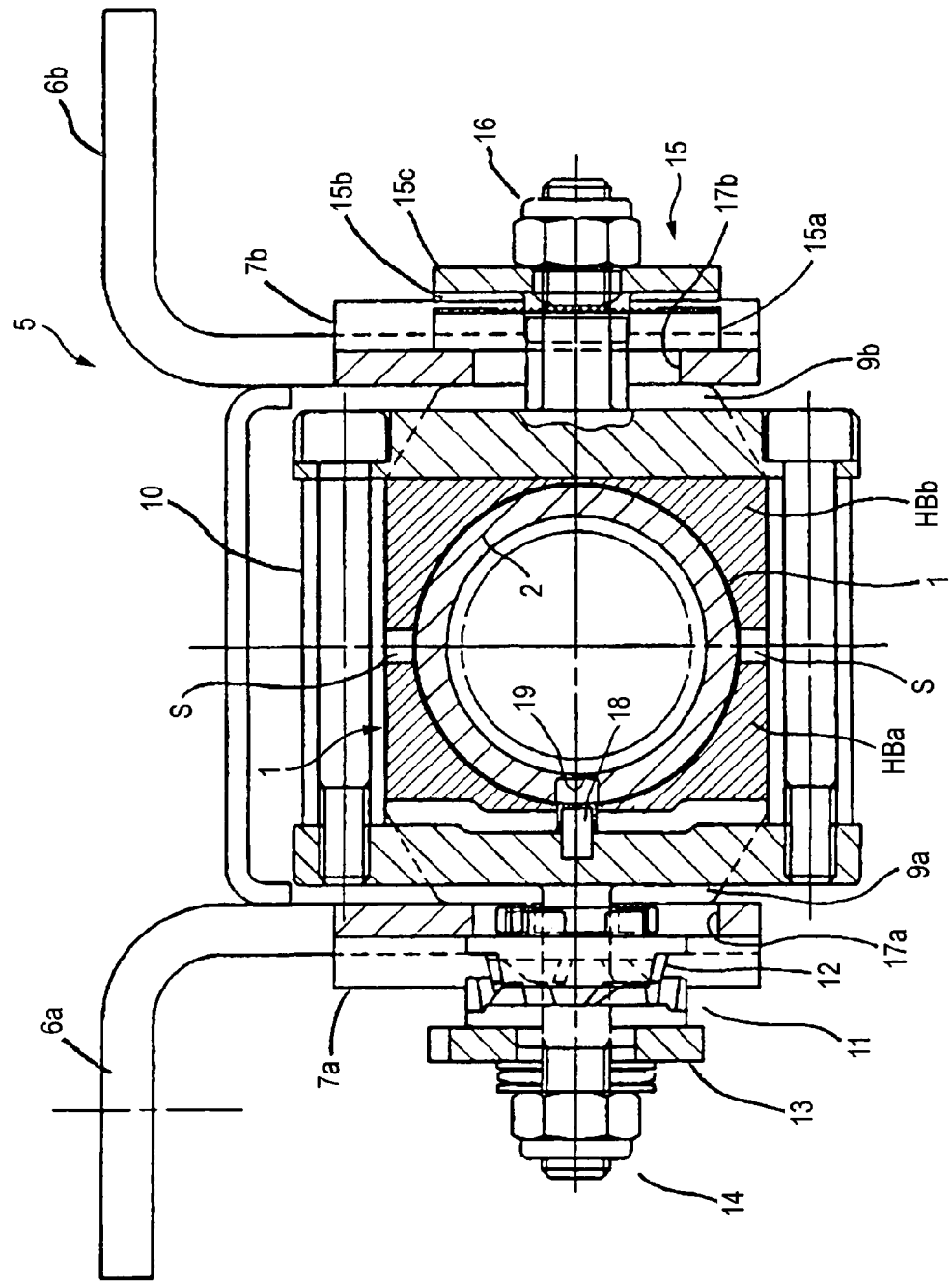
FIG. 3 is a cross-sectional view taken along the line III-III shown in FIG. 1.

FIG. 2 is a cross-sectional view taken along the line II-II in FIG. 1. FIG. 3 is a cross-sectional view taken along the line III-III in FIG. 1.

Figure 4:
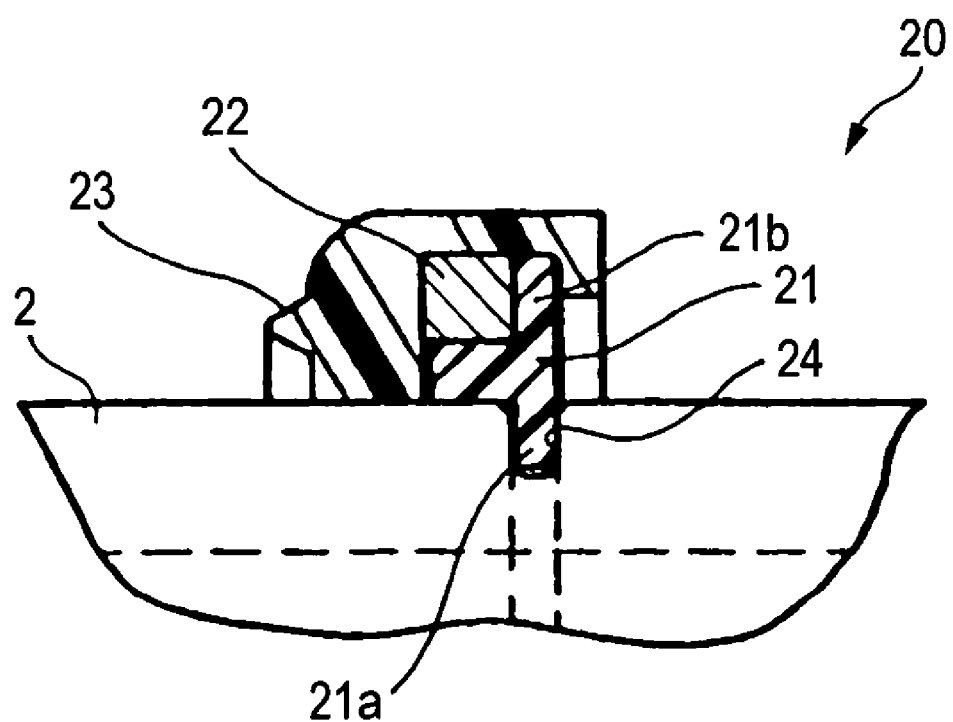
FIG. 4 is an enlarged view of a portion A in FIG. 4.

FIG. 4 is an enlarged sectional view of a portion A in FIG. 1. FIG. 5A is a side view (a view as viewed from arrows a-a in FIG. 5B) of a resin ring of a shear ring which is divided, FIG. 5B is a front view of the resin ring of the divided shear ring, and FIG. 5C is an enlarged view of a portion C in FIG. 5B. FIG. 6 is a graph showing a relationship between energy absorbing loads and strokes.

In the first embodiment, as shown in FIG. 1, an upper side inner column 2 slidably (telescopically slidably) fits into a lower side outer column 1.

A steering shaft is rotatably supported in these columns 1, 2, and this steering shaft is divided into a lower side shaft 3 and an upper side shaft 4 so as to telescopically slide in the interior of both the columns 1, 2 and is constructed to collapse to contract when a vehicle is brought into a secondary collision.

A vehicle body side bracket 5 is provided in such a manner as to surround this lower side outer column 1. This vehicle body side bracket 5 includes a pair of vehicle body mount portions 6a, 6b and a pair of left and right facing flat plate portions 7a, 7b which extend substantially vertically at a location extending from the pair of vehicle body mount portions 6a, 6b toward the front of the vehicle. As shown in FIG. 3, a pair of tilting elongated holes 17a, 17b are formed in the pair of facing flat plate portions 7a, 7b.

The outer column 1 has two upper and lower slits S (slots) at a location thereof which faces the rear of the vehicle so as to define a pair of left and right half body portions HBa, HBb which are transversely equally divided along an axial direction of the outer column 1.

Two pairs of clamping portions 8a, 8b, 9a, 9b are provided in front of and behind these half body portions HBa, HBb as seen in a longitudinal direction of the vehicle, and the slits S (slots) are provided between these two pairs of clamping portions 8a, 8b, 9a, 9b.

By this configuration, in the event that the width of the pair of facing flat plate portions 7a, 7b of the vehicle body side bracket 5 is reduced such that the two pairs of clamping portions 8a, 8b, 9a, 9b are pressed to approach each other, the lower side outer column 1 (the pair of the half body portions HBa, HBb) is reduced in diameter to thereby clamp the upper side inner column 2.

A substantially annular tension member 10 is provided around an outer circumference of the pair of left and right half body portions HBa, HBb between the two pairs of clamping portions 8a, 8b, 9a, 9b in the longitudinal direction of the vehicle.

An adjusting bolt 14 is fixedly screwed to one side of the tension member 10 via a cam mechanism made up of a pair of cam members 11, 12 and an operation lever 13.

Note that the cam mechanism is made up of the first cam member 11 adapted to rotate together with the operation lever 13 and having an edge portion and a groove portion and the second stationary cam member 12 having an edge portion and a groove portion which are brought into engagement with the edge portion and the groove portion of the first cam member 11.

In addition, an adjusting bolt 16 is fixedly screwed to an opposite side of the tension member 10 via an interlocking rack mechanism 15.

Note that the interlocking rack mechanism 15 is made up of a stationary side rack 15a which is welded to the facing plate portion 7b and a moving side rack 15c which is biased in a direction in which the moving side rack 15c moves away from the stationary side rack 15a via a lifter spring 15b which doubles as a guide.

In addition, as shown in FIG. 3, a pin 18 is provided on the left side of the substantially annular tension member 10 in such a manner as to erect, and a concave telescopic adjustment groove 19 is formed in an outer circumferential surface of the inner column 2 in such a manner as to linearly extend in the axial direction over a predetermined range (a telescopic adjustment range), whereby the pin 18 is constructed to be engaged with or disengaged from the telescopic adjustment groove 19.

Namely, when unfastened, in FIG. 3, the tension member 10 moves leftward by an extent equivalent to a gap between the half body portion HBa and the left side of the tension member 10, and then the pin 18 is brought into engagement with the telescopic adjustment groove 19. As this occurs, the inner column 2 can be adjusted telescopically by an extend equivalent to the axial length of the telescopic adjustment groove 19, and longitudinal end portions of the telescopic adjustment groove 19 also play a role as a stopper when brought into abutment with the pin 18 during a telescopic adjustment.

In addition, when clamped, as shown in FIG. 3, the upper side inner column 2 can be collapsed beyond the telescopic adjustment range since the pin 18 is disengaged from the telescopic adjustment groove 19.

From this configuration, when tilt and telescopic adjustments are implemented, the driver first rotates the operation lever 13 in a clockwise direction. Then, the first cam member 11, which is in engagement with the operation lever 13, rotates relative to the second cam member 12, whereby the widthwise dimension of the cam mechanism is reduced.

As this occurs, the moving side rack 15c, which is biased by the lifter spring 15b, moves away from the stationary side rack 15a, whereby the fixing by the interlocking rack mechanism 15 is released so as to permit a tilting motion of the both columns 1, 2.

In addition, when the widthwise dimension of the cam mechanism is reduced, the tensile force acting between the pair of facing flat plate portions 7a, 7b via the tension member 10 is lost, and the pressing force against the two pairs of clamping portions 8a, 8b, 9a, 9b on interior surfaces of the pair of facing flat plate portions 7a, 7b vanishes.

As this occurs, the lower side outer column 1 (the pair of half body portions HBa, HBb) expands in diameter due to its resiliency and loses its securing force relative to the upper side inner column 2 to thereby permit a telescopic motion of the upper side inner column 2.

When having completed the adjustment of the position of the steering wheel by performing the tilt and telescopic adjustments, the driver rotates the operation lever 13 in a counterclockwise direction. Then, since the widthwise dimension of the cam mechanism is increased, in the rack mechanism 15, the moving side rack 15c and the stationary side rack 15a are brought into mesh engagement with each other via the tension member 10, whereby the both columns 1, 2 are fixed in the tilt direction.

At the same time, in the event that the width of the pair of facing flat plate portions 7a, 7b of the vehicle body side bracket 5 is reduced such that the two pairs of clamping portions 8a, Bb, 9a, 9b are pressed so as to approach each other, the lower side outer column 1 (the pair of half body portions HBa, HBb) is reduced in diameter. As this occurs, the upper side inner column 2 is clamped by the lower side outer column 1 (the pair of half body portions HBa, HBb) which has been reduced in diameter, whereby the upper side inner column 2 is fixed in the telescopic direction.

As shown in FIGS. 1 to 5, in the first embodiment, a shear ring 20 is mounted on an outer circumferential surface of the inner column 2. A gap between this shear ring 20 and a rear end of the lower side outer column 1 is set in accordance with a telescopic stroke.

Figure 5:
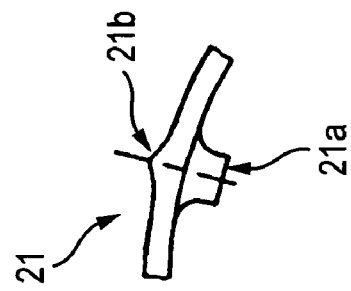
FIG. 5A is a side view of a resin ring of a divided shear ring (a view as viewed from arrows a-a in FIG. 5B)
FIG. 5B is a front view of the resin ring of the divided shear ring.
FIG. 5C is an enlarged view of a portion C in FIG. 5B.
Figure 5:
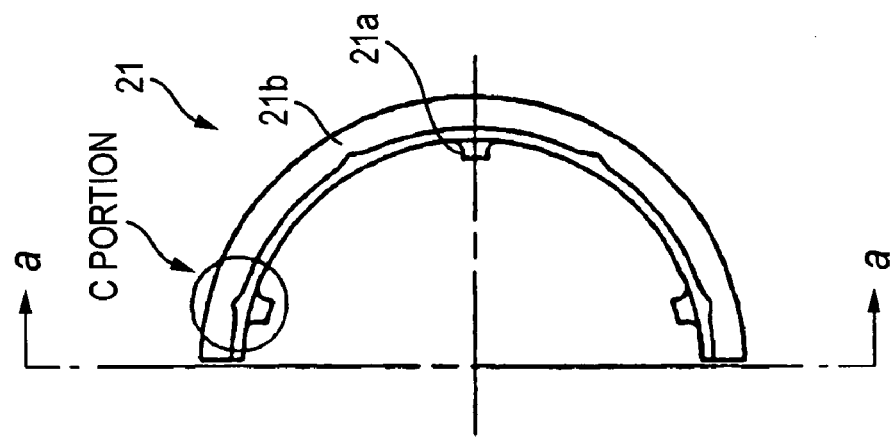
Figure 5:
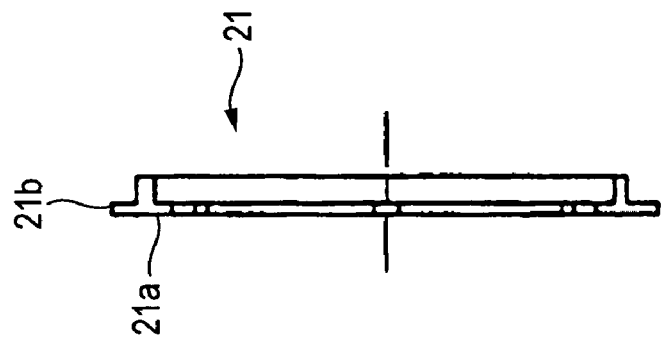
Figure 6:
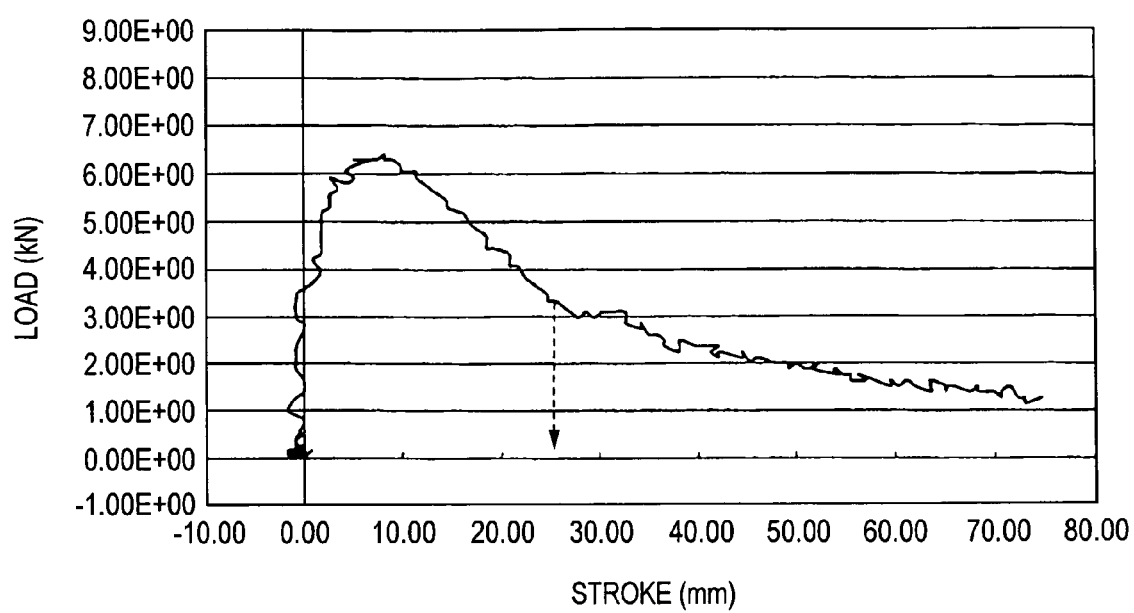
FIG. 6 is a graph showing a relationship between energy absorbing loads and strokes.

As shown in FIGS. 4 and 5, the shear ring 20 is made up of a resin ring 21 formed from a synthetic resin, a metallic ring 22 which is fitted on an outside of the resin ring 21 and a damping member 23 formed from a synthetic resin which is provided in such a manner as to cover both the rings 21, 22.

In addition, a single circumferential groove 24 is formed in the outer circumferential surface of the inner column 2, and furthermore, as shown in FIGS. 5A, 5B, and 5C, a plurality of shear permissive projections 21a are formed on an inner circumferential surface of the resin ring 21. The shear permissive projections 21a on the resin ring 21 are adapted to be brought into engagement with the groove 24 in the inner column 2.

A plurality of minute projections 21b are formed on an outer circumferential surface of the resin ring 21. The minute projections 21a are such as to be brought into contact with an inside diameter of the metallic ring 22 so as to maintain a press-fitted condition.

Furthermore, while the resin ring 21 is constructed to be divided into two in a circumferential direction, the resin ring 21 may be constructed to be divided into three or more in the circumferential direction.

Thus, the resin ring 21 is divided into two and is assembled to the inner column 2 from the left and right thereof. Furthermore, after the resin ring 21 has been mounted on the outer circumferential surface of the inner column 2 while the shear permissive projections are in engagement with the groove 24 in the inner column 2, the metallic ring 22 is lightly press fitted on the resin ring 21 from the outer circumferential side so as to be fixed thereto. Thereafter, the damping member 23 located on the outer column 1 side is mounted in such a manner as to cover the resin ring 21 and the metallic ring 22.

Note that this damping member 23 functions to eliminate abutment noise and to prevent an impact when a telescopic sliding occurs or when the damping member 23 is brought into abutment with a rear end face of the lower side outer column 2.

Thus, in the first embodiment, since the shear ring 20 is mounted on the outer circumferential surface of the inner column 2 and the shear permissive projections 21a on the resin ring 21 are in engagement with the groove 24 in the inner column 2, the shear ring 20 can function as the stopper which regulate the telescopic stroke within the predetermined range by restricting the telescopic stroke when brought into contact with a rear end of the outer column 1.

In contrast, in the event that a running automobile collides with another automobile or an obstacle on the road, the driver is brought into a secondary collision with the steering wheel due to inertia, and a large collapsing load is applied to the inner column 2. The inner column 2 enters the interior of the outer column 1, whereby the collapse of the steering column is started.

When the inner column 2 enters the interior of the outer column 1 a predetermined amount, bringing the rear end of the outer column 2 into abutment with the shear ring 20, the shear permissive projections 21a brake off and the resin ring 21 of the shear ring 20 is disengaged from the inner column 2.

Thereafter, the damping member 23 is disengaged together with the resin ring 21 which is having no shear permissive projection 21a and the metallic ring 22, and since the inside diameter of the damping member 23 is larger than the outside diameter of the inner column 2, the damping member 23 performs a relative movement with generating no load.

Consequently, there is no case where the disengaged shear ring 20 affects the impact energy absorbing load, thereby making it possible to suppress the generation of a peak load during the collapse at the time of secondary collision to a minimum level.

A graph shown in FIG. 6 illustrates a relationship between energy absorbing loads and strokes, which is actually measured data with respect to the first embodiment. While a shear start point of the resin ring 21 is a position where a stoke of about 25 mm occurs, it is seen that the generation of a peak load by the first embodiment is hardly recognized thereat.

In addition, the shear load can be adjusted by altering the shape, number, axial length and depth (height) of the shear permissive projections 21a provided on the resin ring 21.

Furthermore, as with a modified example to a second embodiment, which will be described later on, the energy absorbing properties can be altered by providing the resin ring 21 and the metallic ring 22 on the outer circumference of the inner column 2 in a plurality of steps.

Furthermore, while the shear ring 20 is provided on the outer circumferential surface of the inner column 2, the shear ring 20 may be provided on an inner circumferential surface of the outer column 1.

SECOND EMBODIMENT

Tilt and Telescopic Type

Figure 7:
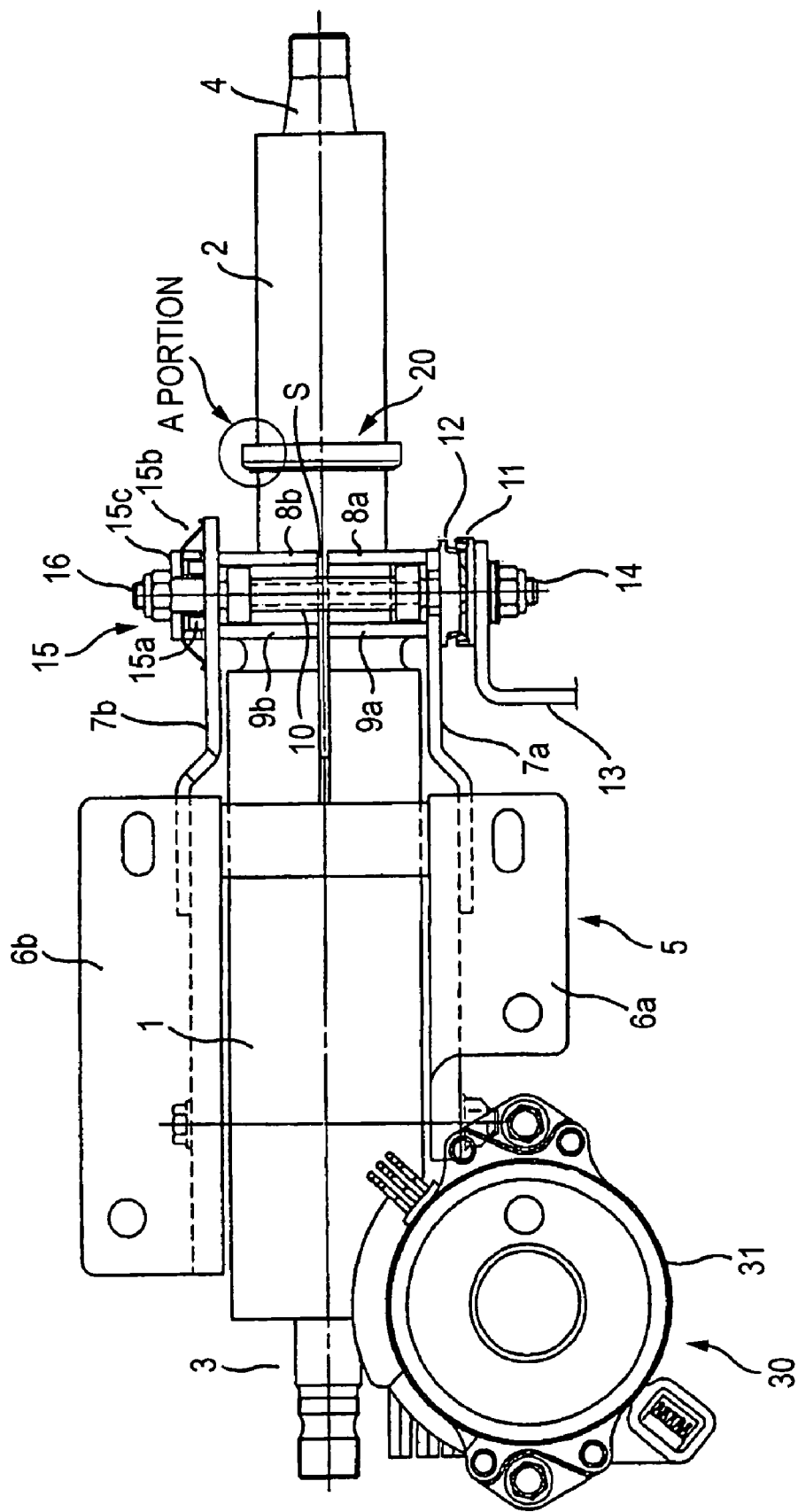
FIG. 7 is a plan view of an automotive tilt and telescopic steering column apparatus according to a second embodiment of the invention.

FIG. 7 is a plan view of an automotive tilt and telescopic type steering column apparatus according to a second embodiment of the invention.

In the second embodiment, an electric power steering system 30 is provided on a lower side outer column 1. The other constructions and functions remain the same as those of the aforesaid embodiment.

The electric power steering system 30 has advantages that since an on-board battery is used as a power supply for an electric motor 31, there is generated no direct drive loss of an engine, that since the electric motor 31 is activated only when assisting the steering effort, the deterioration of fuel economy (an alternator-related drive loss of the engine) can be suppressed, and that an extremely easy electronic control can be permitted.

As with the first embodiment, in the second embodiment, a shear ring 20 is mounted on an outer circumferential surface of an inner column 2. A gap between the shear ring 20 and an rear end of the lower side outer column 1 is set in accordance with telescopic strokes. The other constructions and functions related to the shear ring 20 remain the same as those of the embodiment that has been described previously.

Figure 8:
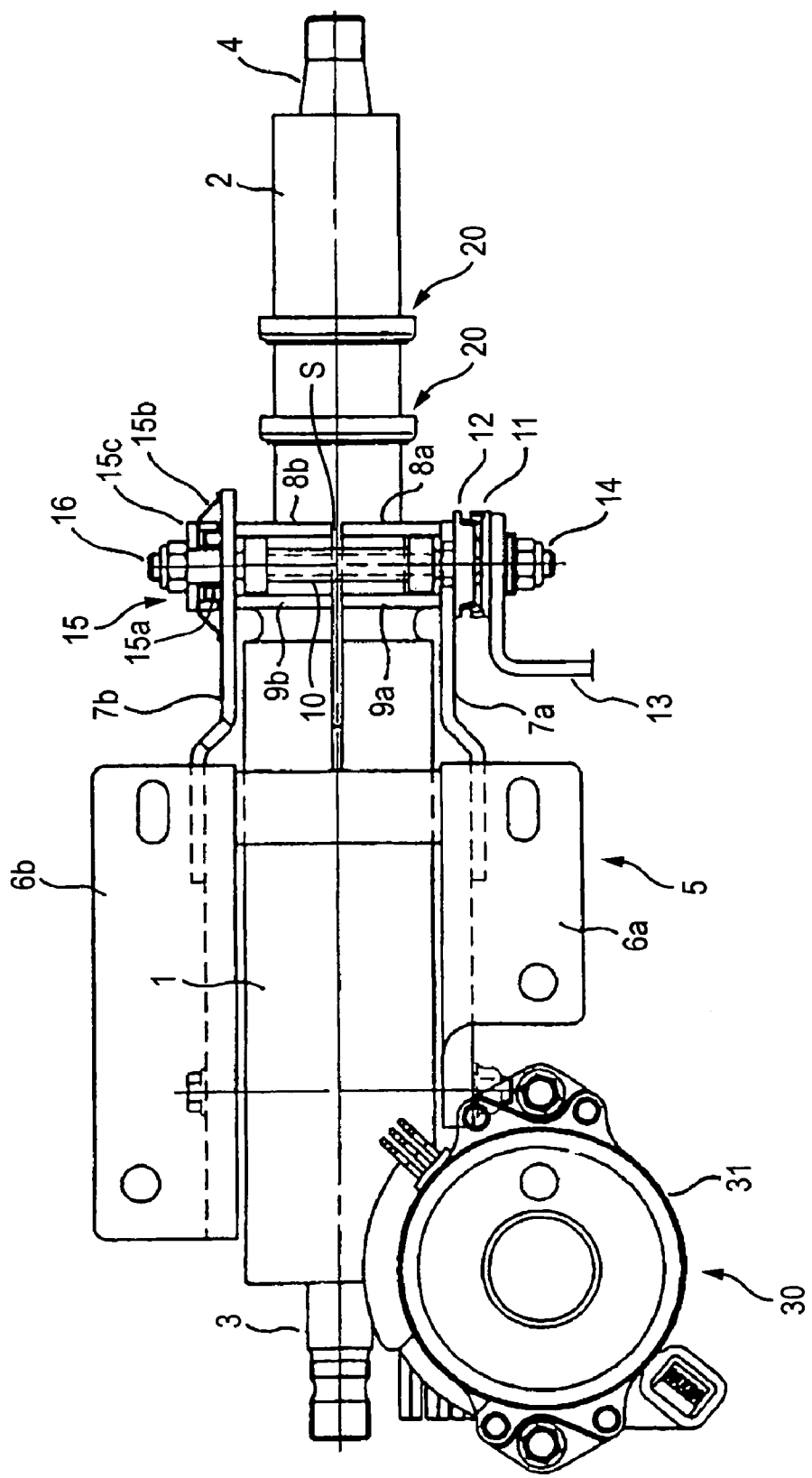
FIG. 8 is a plan view of a modified example to the automotive tilt and telescopic steering column apparatus according to the second embodiment.

FIG. 8 is a plan view of an automotive tile and telescopic steering column apparatus according to a modified example to the second embodiment of the invention.

In this modified example, two shear rings 20 are provided on the outer circumference of the inner column 2. Thus, by providing the shear rings 20 in a plurality of steps like this, the energy absorbing properties can be varied.

THIRD EMBODIMENT

Figure 9:
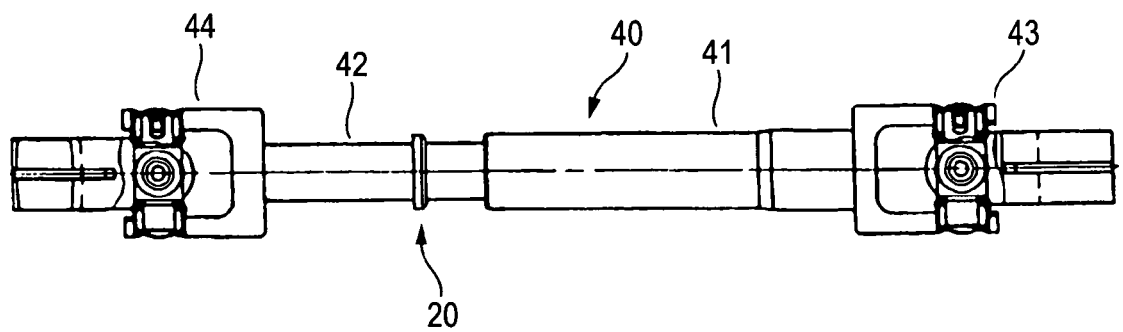
FIG. 9 is a side view of an intermediate shaft of an automotive steering shaft according to a third embodiment of the invention.

FIG. 9 is a side view of an intermediate shaft of an automotive steering shaft according to a third embodiment of the invention.

In this third embodiment, an intermediate shaft 40 of the steering shaft includes an outer tube 41 connected to an upper side universal joint 43 and an inner shaft 42 connected a lower side universal joint 44. This intermediate shaft 40 is constructed such that the outer tube 41 and the inner shaft 42 can slide relative to each other when a telescopic motion occurs, when assembled, when a vehicle turns while running, or when a secondary collision occurs.

In this embodiment, a shear ring 20 is mounted on an outer circumferential surface of the inner shaft 42. A gap between the shear ring 20 and a distal end of the outer tube 41 is set in accordance with telescopic strokes or the like. The other constructions and functions of the shear ring 20 remain the same as those of the aforesaid embodiments.

Thus, in the third embodiment, the shear ring 20 is mounted on the outer circumferential surface of the inner shaft 42, and the shear ring 20 can function as a stopper for regulating the telescopic stroke within a predetermined range by restricting the telescopic stroke by being brought into contact with the distal end of the outer tube 41.

In addition, when there occurs a secondary collision, the outer tube 41 advances a predetermined amount, and when the distal end of the outer tube 41 is brought into abutment with the shear ring 20, the shear ring 20 is constructed to be disengaged from the inner shaft 42 through the shear of shear permissive projections 21a thereof.

FOURTH EMBODIMENT

Tilt and Telescopic Type

Figure 10:
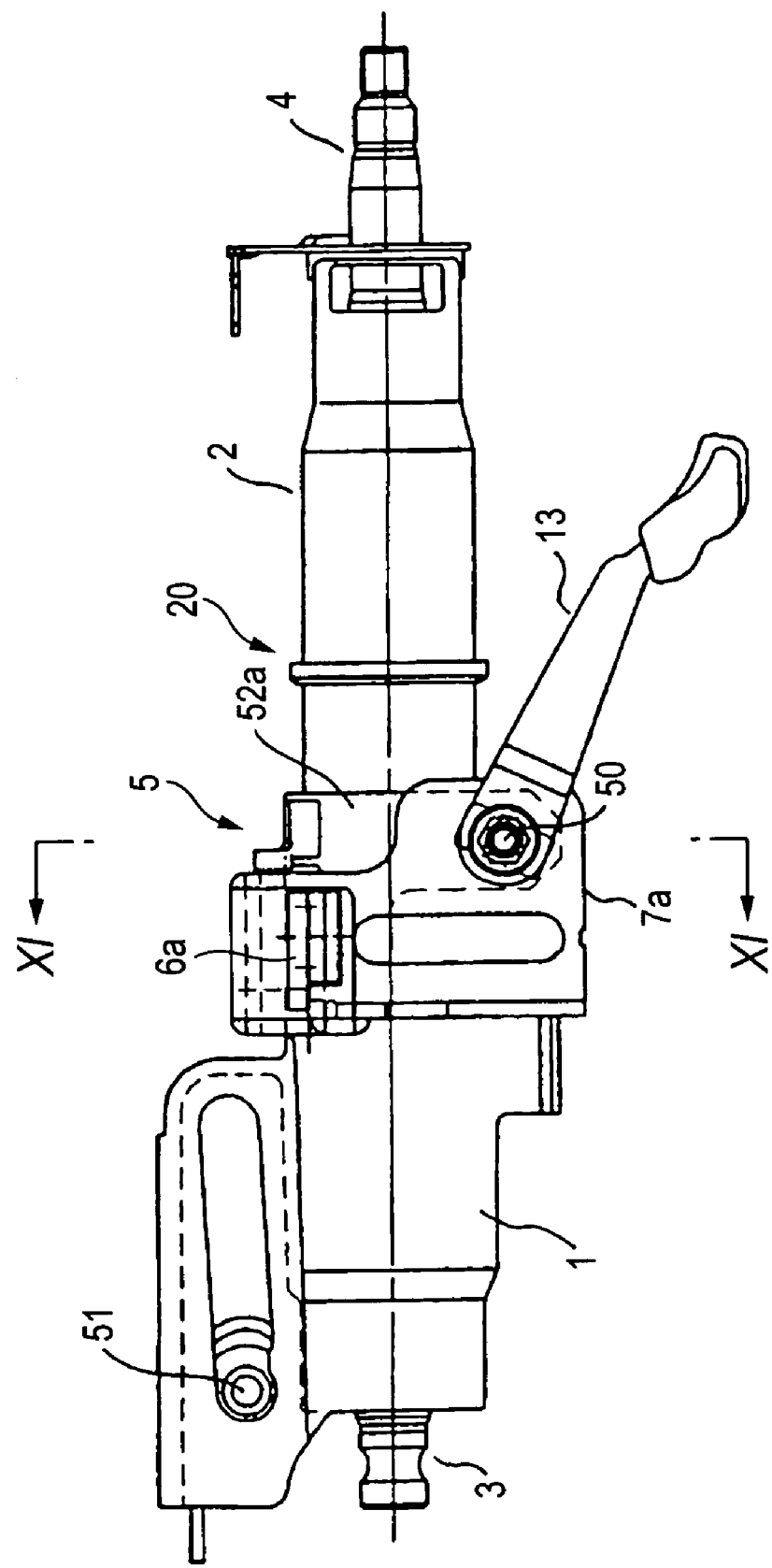
FIG. 10 is a side view of an automotive tilt and telescopic steering column apparatus according to a fourth embodiment of the invention.
Figure 11:
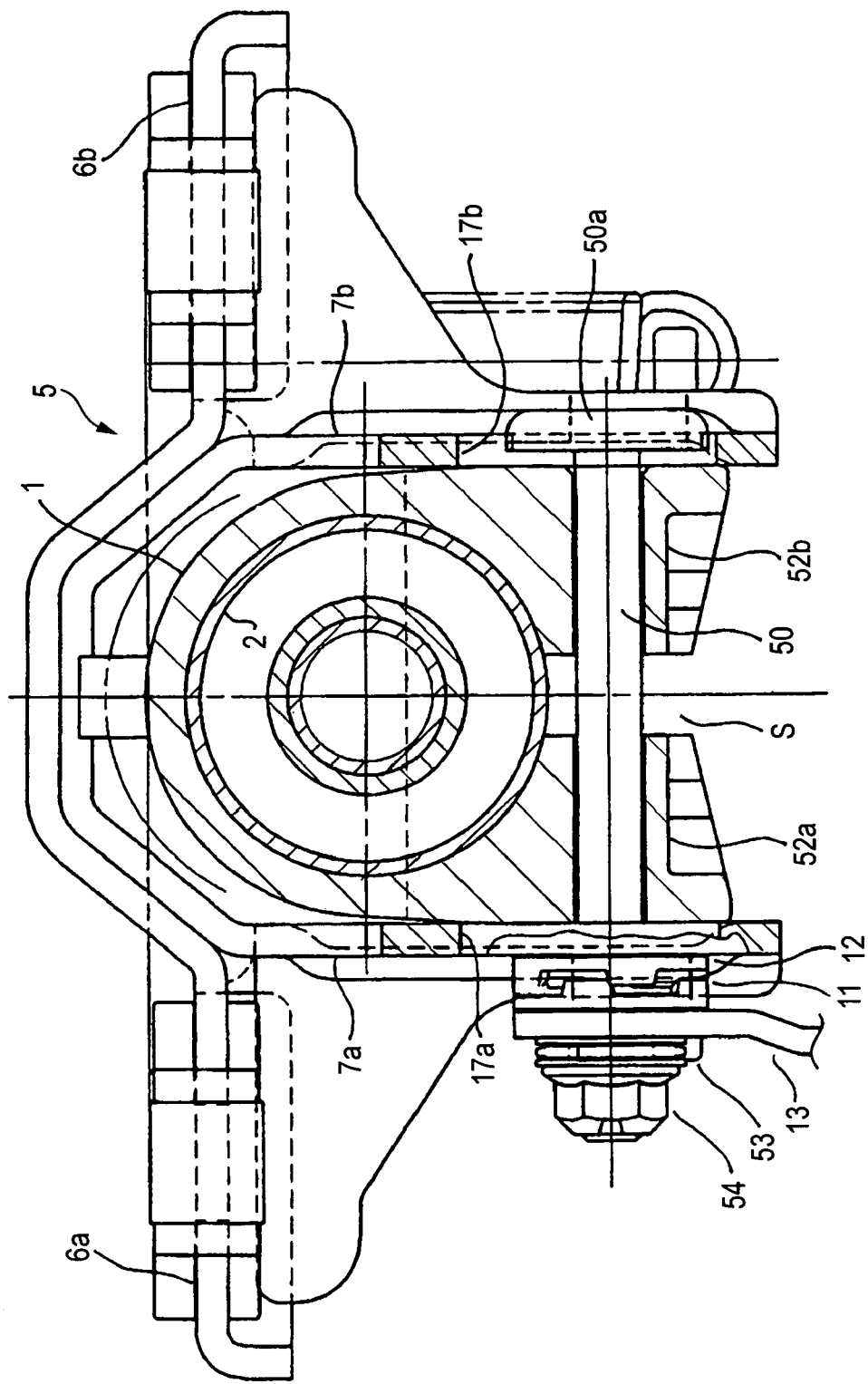
FIG. 11 is a cross-sectional view taken along the line XI-XI in FIG. 10.

FIG. 10 is a side view of an automotive tilt and telescopic steering column apparatus according to a fourth embodiment of the invention. FIG. 11 is across-sectional view taken along the line XI-XI in FIG. 10.

In the fourth embodiment, as shown in FIG. 10, an upper side inner column 2 is slidably (telescopically slidably) fitted into a lower side outer column 1.

A steering shaft is rotatably supported in the interior of these columns 1, 2, and the steering shaft is divided into a lower side shaft 3 and an upper side shaft 4 so as to slide telescopically in the interior of both the columns 1, 2 and is constructed to collapse to contract when a vehicle is brought into a secondary collision.

The outer column 1 is constructed to freely tilt about a tile center pin 51 provided on a vehicle body side. In addition, as shown in FIG. 11, the outer column 1 has a pair of clamping portions 52a, 52b which are separated from each other across a gap equivalent to a slit S behind a longitudinal rear end thereof.

When the clamping portions 52a, 52b are clamped or released, the inner column 2 can slide axially to implement a telescopic adjustment, whereas when clamped, the clamping portions 52a, 52b can embrace to hold the outer circumference of the inner column 2 to effect tilt and telescopic clamping.

A vehicle body side bracket 5 is provided in such a manner as to surround the outer column 1. This vehicle body side bracket 5 has a pair of vehicle body mount portions 6a, 6b, as well as a pair of left and right facing flat plate portions 7a, 7b which extend substantially vertically at a location extending from the pair of vehicle body mount portions 6a, 6b towards the front of the vehicle. As shown in FIG. 11, a pair of tilting elongated holes 17a, 17b are formed in the pair of facing flat plate portions 7a, 7b, respectively.

In a clamping mechanism, a tightening 50 is passed through the pair of tilting elongated holes 17a, 17b formed in the facing flat plate portions 7a, 7b, and this tightening bolt 50 is constructed not to rotate at a normal time through the engagement of part of a head portion 50a with the tilting elongated hole 17b.

An adjustment nut 54 is fixedly screwed on a threaded portion of the tightening bolt 50 via a cam mechanism made up of a pair cam member 11, 12, an operation lever 13 and a thrust bearing 53. Note that the cam mechanism includes the first cam member 11 adapted to rotate together with the operation lever 13 and having an edge portion and a groove portion and the stationary second cam member 12 having an edge portion and a groove portion which are brought into engagement with the edge portion and the groove portion of the first cam member 11.

Consequently, when implementing tilt and telescopic adjustments, in the event that the operation lever 13 is rotated in one direction, the width of the pair of cam members 11, 12 is reduced, and the tightening of the tightening bolt 50 is released. As a result, the gap between the pair of the facing flat plate portions 7a, 7b is widened, and the clamping by the pair of clamping portions 52a, 52b is released, whereby the width thereof is expanded. As this occurs, the inner column 2 rotates together with the outer column 1 and the like about the tile center pin 51 so that a tilting adjustment can be implemented, and the inner column 2 slides in the axial direction thereof so that a telescopic adjustment can be implemented.

In contrast, when implementing tilt and telescopic clamping, in the event that the operation lever 13 is rotated in an opposite direction, the width of the pair of cam members 11, 12 is expanded, and the tightening bolt 50 is tightened. The gap of the pair of facing flat plate portions 7a, 7b is narrowed, whereby the pair of clamping portions 52a, 52b are clamped. As this occurs, the pair of clamping portions 52a, 52b are brought into press contact with the inner column 2 to hold the same to thereby effect tilt and telescopic clamping.

In the fourth embodiment, as shown in FIG. 10, since a shear ring 20 is mounted on an outer circumferential surface of the inner column 2 and shear permissive projections 21a on a resin ring 21 thereof are in engagement with a groove 24 in the inner column 2, the shear ring 20 can function as a stopper for regulating the telescopic stroke within a predetermined range by being brought into contact with a rear end of the outer column 1 to thereby restrict the telescopic stroke.

In contrast, when the running automobile comes into collision with another automobile or an obstacle on the road, the driver is brought into a secondary collision with the steering wheel due to inertia, and a large collapsing load is applied to the inner column 2. The inner column 2 enters the interior of the outer column 1 to thereby start the collapse of the steering column.

When the inner column 2 enters the interior of the outer column 1 a predetermined amount such that the rear end of the outer column 1 is brought into abutment with the shear ring 20, the shear permissive projections 21*a* brake off, whereby the resin ring 21 of the shear ring 20 is disengaged from the inner column 2.

Thereafter, a damping member 23 is disengaged together with the resin ring 21 which is having no shear permissive projection 21*a* and a metallic ring 22, and since the inside diameter of the damping member 23 is larger than the outside diameter of the inner column 1, the damping member 23 performs a relative movement with no load being generated.

Consequently, there is no case where the disengaged shear ring 20 affects the impact energy absorbing load, thereby making it possible to suppress the generation of a peak load during the collapse at the time of secondary collision to a minimum level.

FIFTH EMBODIMENT

Tilt and Telescopic Type

Figure 12:
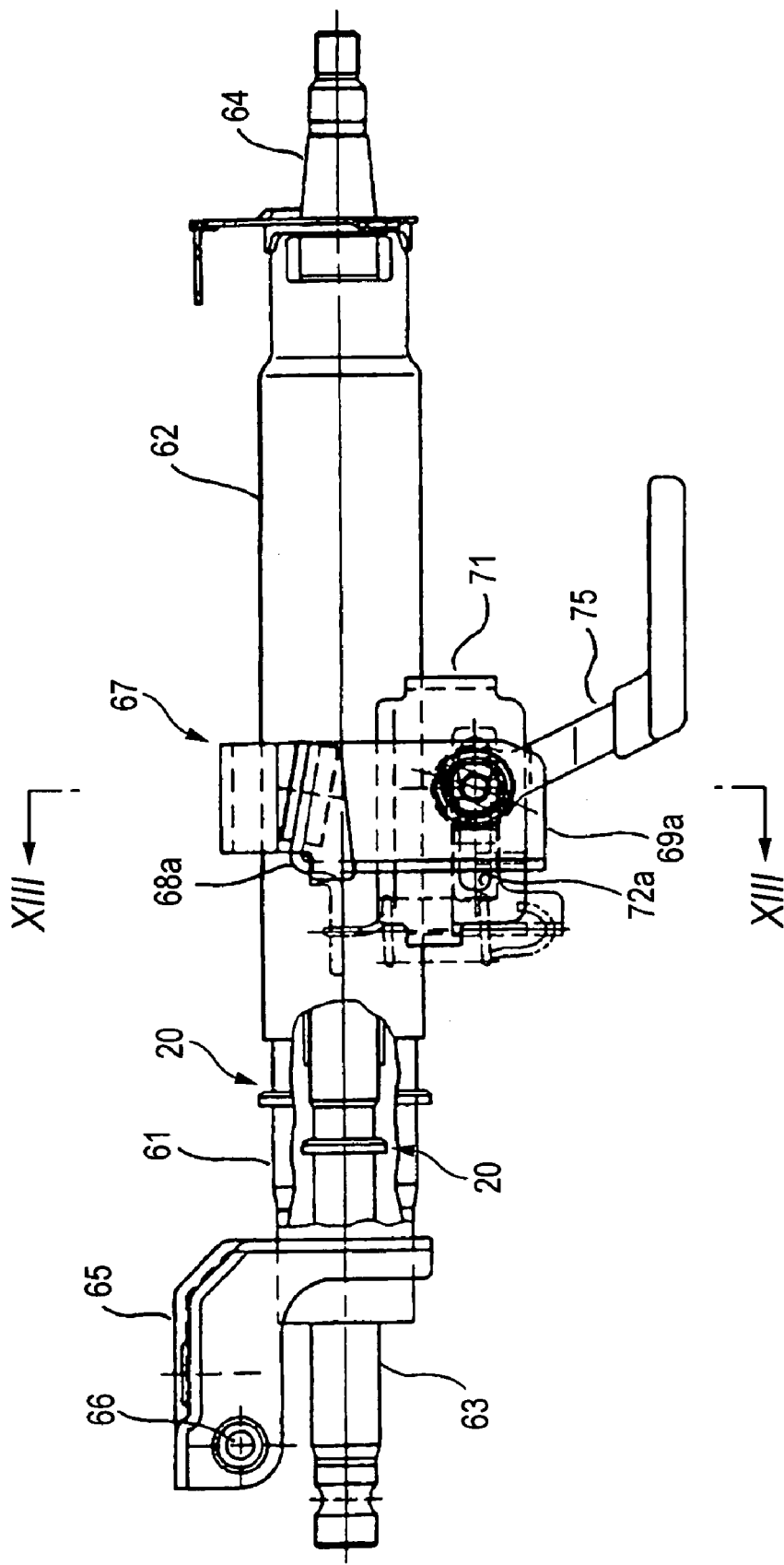
FIG. 12 is a side view of an automotive tilt and telescopic steering column apparatus according to a fifth embodiment of the invention.
Figure 13:
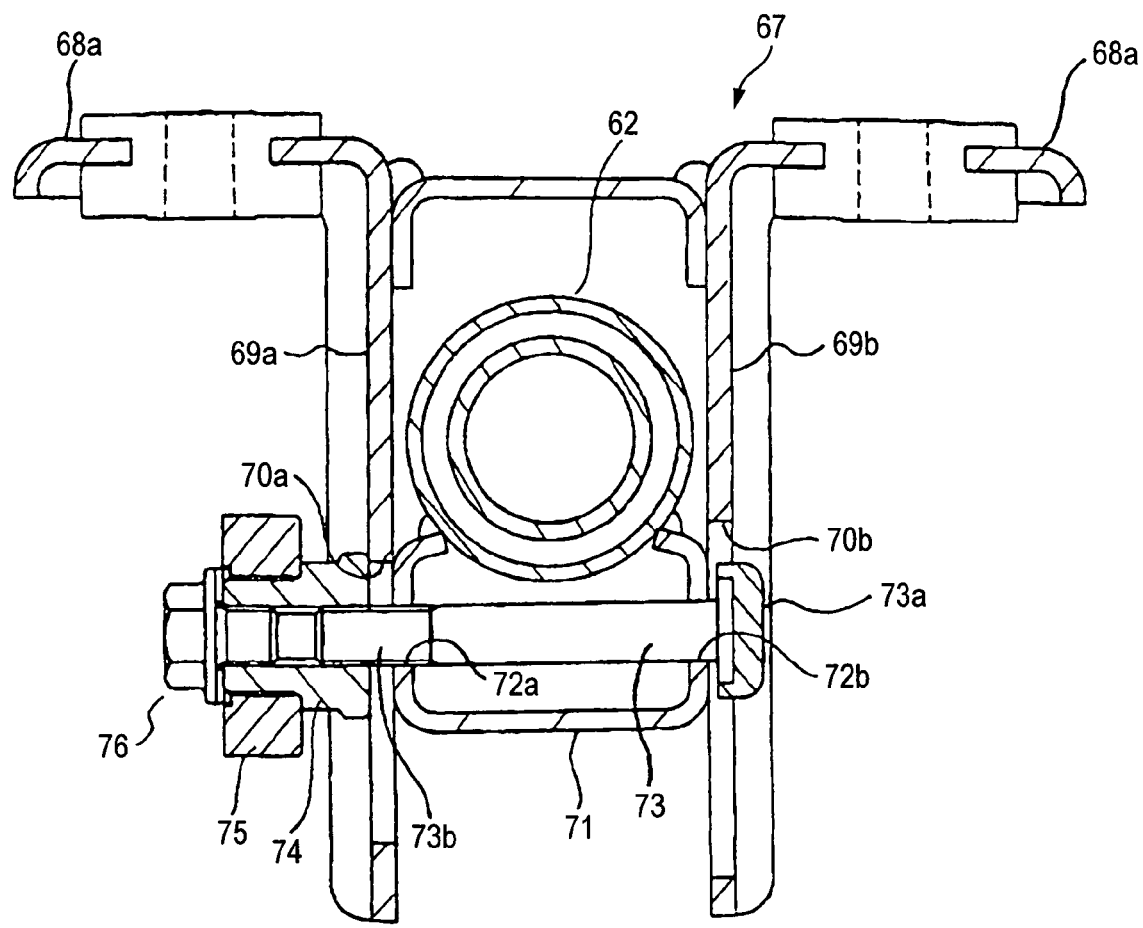
FIG. 13 is a cross-sectional view taken along the line XIII-XIII in FIG. 12.

FIG. 12 is a side view of an automotive tilt and telescopic steering column according to a fifth embodiment of the invention. FIG. 13 is a cross-sectional view taken along the line XIII-XIII in FIG. 12.

In the fifth embodiment, as shown in FIG. 12, an upper side outer column 62 is slidably (telescopically slidably) fitted over a lower side inner column 61.

A steering shaft is rotatably supported in the interior of these columns 61, 62, and the steering shaft is divided into a lower side inner shaft 63 and an upper side outer tube 64 so as to slide telescopically in the interior of both the columns 61, 62 and is constructed to collapse to contract when a vehicle is brought into a secondary collision.

A lower side vehicle body bracket 65 is provided at an end thereof which faces the front of the vehicle, and the lower side inner column 61 is constructed to freely tile about a tilt center pin 66 provided on the lower side vehicle body bracket 65.

An upper side vehicle body bracket 6 is provided in such a manner as to surround the outer column 62. This upper side vehicle body bracket 67 includes a pair of vehicle body mount portions 68*a*, 68*b*, as well as a pair of left and right facing flat plate portions 69*a*, 69*b* which extend substantially vertically from the pair of vehicle body mount portions 68*a*, 68*b*. As shown in FIG. 13, a pair of tilting elongated holes 70*a*, 70*b* are formed in the pair of facing flat plate portions 69*a*, 69*b*, respectively.

A distance bracket 71 is fixed to an underside of the outer column 62 through welding or the like, and a pair of telescoping elongated holes 72*a*, 72*b* are formed in side walls of the distance bracket 71.

In a clamping mechanism, a tightening bolt 73 is passed through the pair of tilting elongated holes 70*a*, 70*b* formed in the facing flat plate portions 69*a*, 69*b*, and this tightening bolt 73 is constructed not to rotate at a normal time by bringing part of a head portion 73*a* thereof into engagement with the tilting elongated hole 70*b*.

A tilt nut 74 is screwed on a threaded portion 73*b* of the tightening bolt 73. An operation lever 75 is fixed to this tilt nut 74 and is mounted thereon with a mounting bolt 76.

Consequently, when implementing tilt and telescopic adjustments, in the event that the operation lever 75 is rotated in one direction, the tilt nut 74 rotates, whereby the tightening by the tightening bolt 73 is released, the gap between the pair of facing flat plate portions 69*a*, 69*b* is expanded, and the press contact between the facing flat plate portions 69*a*, 69*b* with the side walls of the distance bracket 71 is released, whereby the outer column 2 rotates together with the inner column 1 about the tile center 66 for a tilt adjustment and slide in the axial direction for a telescopic adjustment.

In contrast, when implementing tilt and telescopic clamping, in the event that the tilt nut 74 is rotated in an opposite direction, the tightening bolt 73 is tightened, the gap between the pair of facing flat plate portions 69*a*, 69*b* is then narrowed so that the facing flat plate portions 69*a*, 69*b* are brought into press contact with the side walls of the distance bracket 71, whereby tilt and telescopic clamping can be implemented.

Also in the fifth embodiment, as shown in FIG. 12, a shear ring 20 is mounted on an outer circumferential surface of the inner column 61. A gap between the shear ring 20 and a distal end of the upper side outer column 62 is set in accordance with telescopic strokes. The other constructions and functions of the shear ring 20 remain the same as those of the embodiments that have been described heretofore.

Thus, in the fifth embodiment, since the shear ring 20 is mounted on the outer circumferential surface of the inner column 61 and shear permissive projections 21*a* on a resin ring 21 are in engagement with a groove 24 in the outer column 62, the shear ring 20 can function as a stopper for regulating the telescopic stroke within a predetermined range by being brought into contact with the distal end of the outer column 62 so as to restrict the telescopic stroke.

In contrast, when the running automobile comes to collide with another vehicle or an obstacle on the road, the driver is brought into a secondary collision with the steering wheel due to inertia, and a large collapsing load is applied to the outer column 62. The outer column 62 advances a predetermined amount, and when the distal end of the outer column 62 abuts with the shear ring 20, the shear permissive projections 21*a* break off, and the resin ring 21 of the shear ring 20 is disengaged from the inner column 61.

Thereafter, a damping member 23 is disengaged together with the resin ring 21 which is having no shear permissive projection 21*a* and a metallic ring 22, and since the inside diameter of the damping member 23 is larger than the outside diameter of the inner column 61 the damping member 23 performs a relative movement with no load being generated.

Consequently, there is no case where the disengaged shear ring 20 affects the impact energy absorbing load, thereby making it possible to suppress the generation of a peak load during the collapse at the time of secondary collision to a minimum level.

In addition, in the fifth embodiment, a shear ring 20 is mounted on an outer circumferential surface of the inner shaft 63. A gap between the shear ring 20 and the distal end of the outer tube 64 is set in accordance with telescopic strokes. The other constructions and functions of the shear ring 20 remain the same as those of the embodiments that have been described heretofore.

Thus, in the fifth embodiment, the shear ring 20 is mounted on the outer circumferential surface of the inner shaft 63 and the shear ring 20 can function as a stopper for regulating the telescopic stroke within a predetermined range by being brought into contact with the distal end of the outer tube 64 so as to restrict the telescopic stroke.

In contrast, when a secondary collision occurs, the outer tube 64 advances a predetermined amount, and when the distal end of the outer tube 64 abuts with the shear ring 20, the shear permissive projections 21*a* break off, and the shear ring 20 is disengaged from the inner shaft 63.

Note that the invention is not limited to the embodiments that have been described heretofore and can be modified variously. For example, the automotive steering column apparatuses according to the invention can be applied to any of the tilt-type, telescopic-type and tilt and telescopic-type.

As has been described heretofore, according to the invention, since the shear ring is mounted on the outer circumferential surface of the inner column or the like and the shear permissive projections formed on the shear ring are in engagement with the groove formed in the outer circumferential surface of the inner column of the like, the shear ring can function as the stopper for regulating the telescopic stroke within the predetermined ranges by being brought into contact with the end portion of the outer column or the like so as to restrict the telescopic stroke.

In addition, when a secondary collision occurs, for example, when the inner column collapses relative to the outer column and advances to the front of the vehicle, in the event that the shear ring abuts with the end portion of the outer column or the like, the shear permissive projections break off, and the shear ring is disengaged from the inner column. Consequently, there is no case where the disengaged shear ring affects the energy absorbing properties, whereby the generation of a peak load during the collapse at the time of the secondary collision can be suppressed to a minimum.

While the invention has been described in detail and by reference to the specific embodiments, it is clear to those skilled in the art that various modifications can be made thereto without departing from the sprit and scope of the invention.

The present patent application is based on the Japanese Patent Application (the Patent Application No. 2003-149682) filed on May 27, 2003, and the contents thereof are incorporated herein by reference.

INDUSTRIAL APPLICABILITY

As has been described heretofore, the invention can be applied to impact absorbing mechanisms which are adopted in impact absorbing steering column apparatuses and can be applied, in particular, to any of the tilt type, telescopic type and tilt and telescopic type.

The invention claimed is:

1. A telescopic construction comprising:
   an outer member;
   an inner member slidably fitting in the outer member; and
   a shear ring mounted on at least either an inner circumferential surface of the outer member or an outer circumferential surface of the inner member, the shearing ring comprising a metallic ring and a resin ring made of synthetic resin,
   wherein the metallic ring fits on one of an outer circumferential side and an inner circumferential side of the resin ring,
   wherein a shear permissive projection is provided on the shear ring,
   wherein a groove is provided in at least either the inner circumferential surface of the outer member or the outer circumferential surface of the inner member; and
   wherein the shear permissive projection is in engagement with the groove.

2. The telescopic construction as set forth in claim 1, wherein the shear ring is divided in a circumferential direction thereof.

3. An automotive steering column apparatus comprising:
   an inner column rotatably supporting a steering shaft;
   an outer column holding the inner column while rotatably embracing the inner column;
   a vehicle body side bracket having a vehicle body mount portion which can be mounted on a vehicle body and a pair of left and right facing flat plate portions which extend substantially vertically on opposite sides of the outer column, respectively;
   a clamping mechanism for changing a width of the pair of facing flat plate portions and changing a width of an inner circumferential surface of the outer column in connection with a change in the width of the pair of facing flat portions; and
   a shear ring mounted on at least either the inner circumferential surface of the outer column or an outer circumferential surface of the inner column, the shearing ring comprising a metallic ring and a resin ring made of synthetic resin,
   wherein the metallic ring fits on one of an outer circumferential side and an inner circumferential side of the resin ring,
   wherein a shear permissive projection is provided on the shear ring,
   wherein a groove is formed in at least either the inner circumferential surface of the outer column or the outer circumferential surface of the inner column, and
   wherein the shear permissive projection is in engagement with the groove.

4. The automotive steering column apparatus as set forth in claim 3, wherein the shear ring is divided in a circumferential direction thereof.

* * * * *